United States Patent [19]

Nishi et al.

[11] Patent Number: 5,841,767
[45] Date of Patent: Nov. 24, 1998

[54] MOBILE COMMUNICATION SYSTEM USING EFFICIENT SERVICE AREA EXPANSION SCHEME

[75] Inventors: Yasuki Nishi, Yokosukashi; Kazuhito Ebina, Yokohamashi; Susumu Ueno, Yokosukashi, all of Japan

[73] Assignee: NTT Mobile Communications Network Inc., Tokyo, Japan

[21] Appl. No.: 684,230

[22] Filed: Jul. 19, 1996

[30] Foreign Application Priority Data

Jul. 20, 1995 [JP] Japan ................................ 7-184369
Dec. 8, 1995 [JP] Japan ................................ 7-320792

[51] Int. Cl.$^6$ ........................................... H04J 3/16
[52] U.S. Cl. ............................................... 370/329
[58] Field of Search ................................ 370/349, 377, 370/389, 535, 524, 522, 310, 312, 329, 326, 336, 337, 338, 341, 347, 346, 350, 431, 442, 464; 455/67.1, 446, 507, 524, 422, 146.6, 560, 427, 434, 437, 439, 440, 455, 515, 517, 524.1, 525

[56] References Cited

U.S. PATENT DOCUMENTS 5,475,870 12/1995 Weaver et al. ..................... 455/67.1
5,550,992 8/1996 Hashimoto ........................ 370/337
5,613,203 3/1997 Dupuy et al. ...................... 370/337

*Primary Examiner*—Dang Ton
*Attorney, Agent, or Firm*—Oblon, Spivak, McClelland, Maier & Neustadt, P.C.

[57] ABSTRACT

A service area expansion scheme for a mobile communication system, capable of efficiently connecting thinly populated areas (satellite zones) to a mobile communication network so as to expand the service area of the mobile communication system economically. In expanding the service area, remote base stations are set at thinly populated areas, while a remote mobile local switching station for connecting the remote base stations to the mobile communication network is provided. The remote base stations and the remote mobile local switching station are selectively connected through the public network by using the respective channel connection units for providing connections with the public network. The remote base stations and the remote mobile local switching station can be replaced by satellite base stations and a satellite mobile local switching station for connecting the satellite base stations to the mobile communication network. The satellite base stations and the satellite mobile local switching station are selectively connected through the satellite by using the respective satellite connection units for providing connections with the satellite.

30 Claims, 15 Drawing Sheets

MOBILE COMMUNICATION SYSTEM USING EFFICIENT SERVICE AREA EXPANSION SCHEME

BACKGROUND OF THE INVENTION

1. Field of the Invention

The present invention relates to a scheme for expanding a service area of a mobile communication system, by connecting thinly populated areas to a mobile communication network.

2. Description of the Background Art

The service area of the mobile communication system is formed by a multiplicity of communication supported areas (called zones or cells) provided by a multiplicity of base stations, which are distributed throughout a mobile communication network.

FIG. 1 shows an exemplary network configuration of a conventional mobile communication system, in which a mobile communication network (MCN) 81 is connected with a fixedly provided public network 1 through a number of points of interface (POI) 2 at a number of mobile gateway switching stations (MGS) 3.

The mobile gateway switching stations 3 are connected with each other, while each mobile gateway switching station 3 is also connected with a corresponding mobile local switching station (MLS) 4, and each mobile local switching station 4 is connected with a plurality of base stations (BS) 5. Each base station 5 provides its own zone (communication supported area) 6 and communicates with mobile stations located within its own zone 6.

A mobile station can communicate with a subscriber terminal on the public network 1 via the base station 5 associated with the zone 6 in which this mobile terminal is currently located, the mobile local switching station 4 connected with that base station 5, and the mobile gateway switching station 3 connected with that mobile local switching station 4. The entire service area of the mobile communication network 81 is covered by these zones 6 so that a mobile station can make a communication anywhere within the service area of the mobile communication network 81.

Now, the mobile communication system has been developed around major cities and roads, and in Japan, the service area currently covers more than 30% in area and more than 70% in population. Yet, there are many thinly populated areas (called satellite zones) with light potential traffics which are not covered by the current service area but expected to be included in the service area in future.

However, as should be apparent from the network configuration of the conventional mobile communication system shown in FIG. 1, an expansion of the service area in the conventional mobile communication system inevitably requires additional mobile gateway switching stations 3, mobile local switching stations 4, and base stations 5, and therefore it is quite ineconomical to try to expand the service area to include these thinly populated satellite zones, in view of the required costs for additional stations and transmission paths.

SUMMARY OF THE INVENTION

It is therefore an object of the present invention to provide a service area expansion scheme for a mobile communication system, which is capable of efficiently connecting thinly populated areas (satellite zones) to a mobile communication network so as to expand the service area of the mobile communication system economically.

According to one aspect of the present invention there is provided a method for expanding a service area of a mobile communication system, comprising the steps of: setting a plurality of additional base stations for providing additional zones which covers additional areas for expanding the service area, each additional base station having base station channel connection means for providing a connection with a public network; providing an additional mobile local switching station for connecting the additional base stations to a mobile communication network, the additional mobile local switching station having switching station channel connection means for providing a connection with the public network; and selectively connecting the additional base stations with the additional mobile local switching station through the public network by using the base station channel connection means and the switching station channel connection means.

According to another aspect of the present invention there is provided a mobile communication system, comprising: a mobile communication network; a plurality of base stations for providing zones covering a service area of the mobile communication system; and a plurality of mobile local switching stations for connecting said plurality of base stations with the mobile communication network; wherein said plurality of base stations including a plurality of remote base stations, each remote base station having base station channel connection means for providing a connection with a public network; said plurality of mobile local switching stations including a remote mobile local switching station for connecting the remote base stations to the mobile communication network, the remote mobile local switching station having switching station channel connection means for providing a connection with the public network; and said plurality of remote base stations and the remote mobile local switching station being selectively connected through the public network by using the base station channel connection means and the switching station channel connection means.

According to another aspect of the present invention there is provided a method for expanding a service area of a mobile communication system, comprising the steps of: setting a plurality of additional base stations for providing additional zones which covers additional areas for expanding the service area, each additional base station having base station satellite connection means for providing a connection with a satellite; providing an additional mobile local switching station for connecting the additional base stations to a mobile communication network, the additional mobile local switching station having switching station satellite connection means for providing a connection with the satellite; and selectively connecting the additional base stations with the additional mobile local switching station through the satellite by using the base station satellite connection means and the switching station satellite connection means.

According to another aspect of the present invention there is provided a mobile communication system, comprising: a mobile communication network; a plurality of base stations for providing zones covering a service area of the mobile communication system; and a plurality of mobile local switching stations for connecting said plurality of base stations with the mobile communication network; wherein said plurality of base stations including a plurality of satellite base stations, each satellite base station having base station satellite connection means for providing a connection with a satellite; said plurality of mobile local switching stations including a satellite mobile local switching station for connecting the satellite base stations to the mobile communication network, the satellite mobile local switching station having switching station satellite connection means for providing a connection with the satellite; and said plurality of satellite base stations and the satellite mobile local switching station being selectively connected through the satellite by using the base station satellite connection means and the switching station satellite connection means.

Other features and advantages of the present invention will become apparent from the following description taken in conjunction with the accompanying drawings.

DETAILED DESCRIPTION OF THE PREFERRED EMBODIMENTS

Referring now to FIG. 2 to FIG. 8, the first embodiment of the service area expansion scheme for a mobile communication system according to the present invention will be described in detail.

Figure 1:
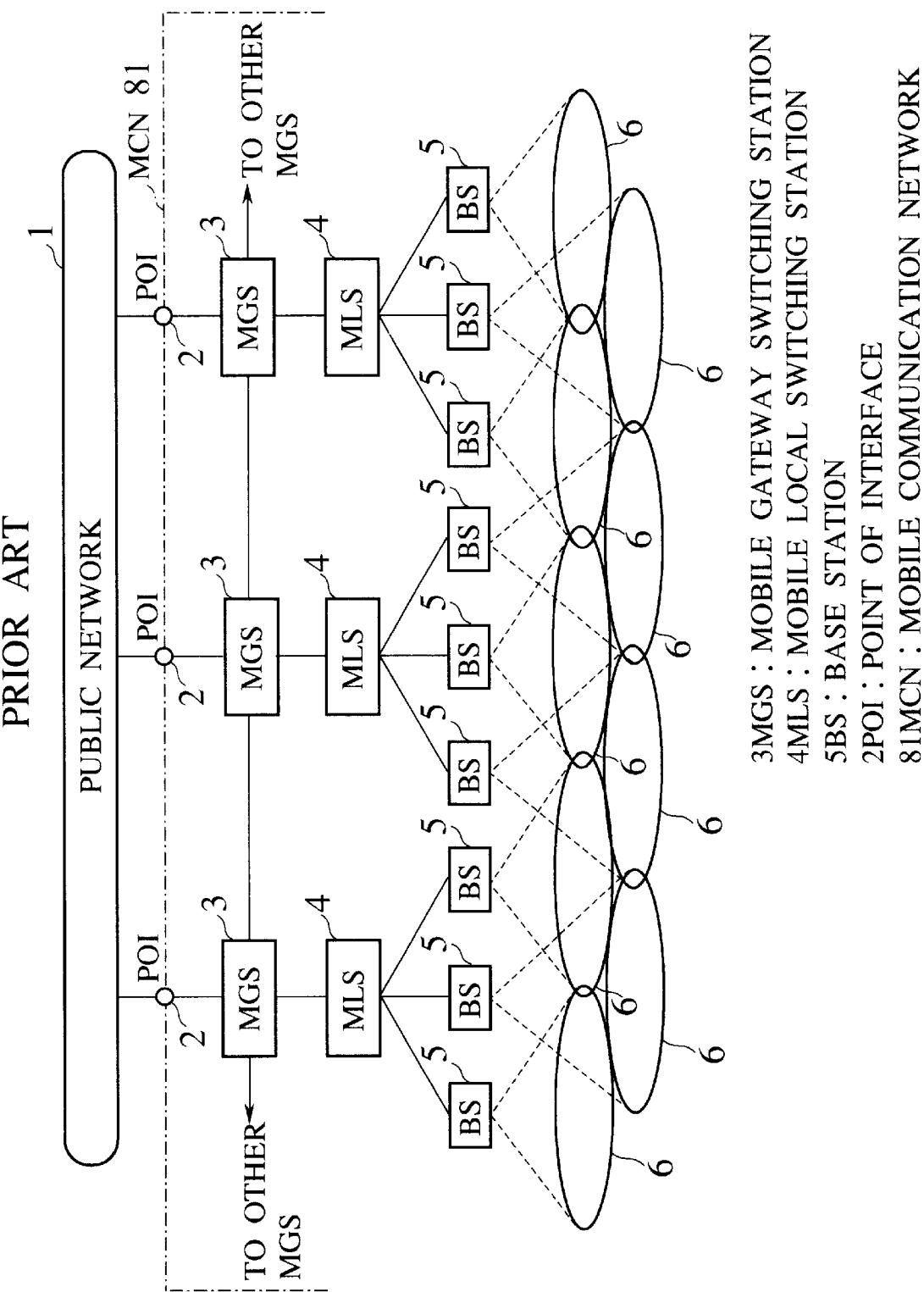
FIG. 1 is a block diagram of a network configuration of a conventional mobile communication system.
Figure 2:
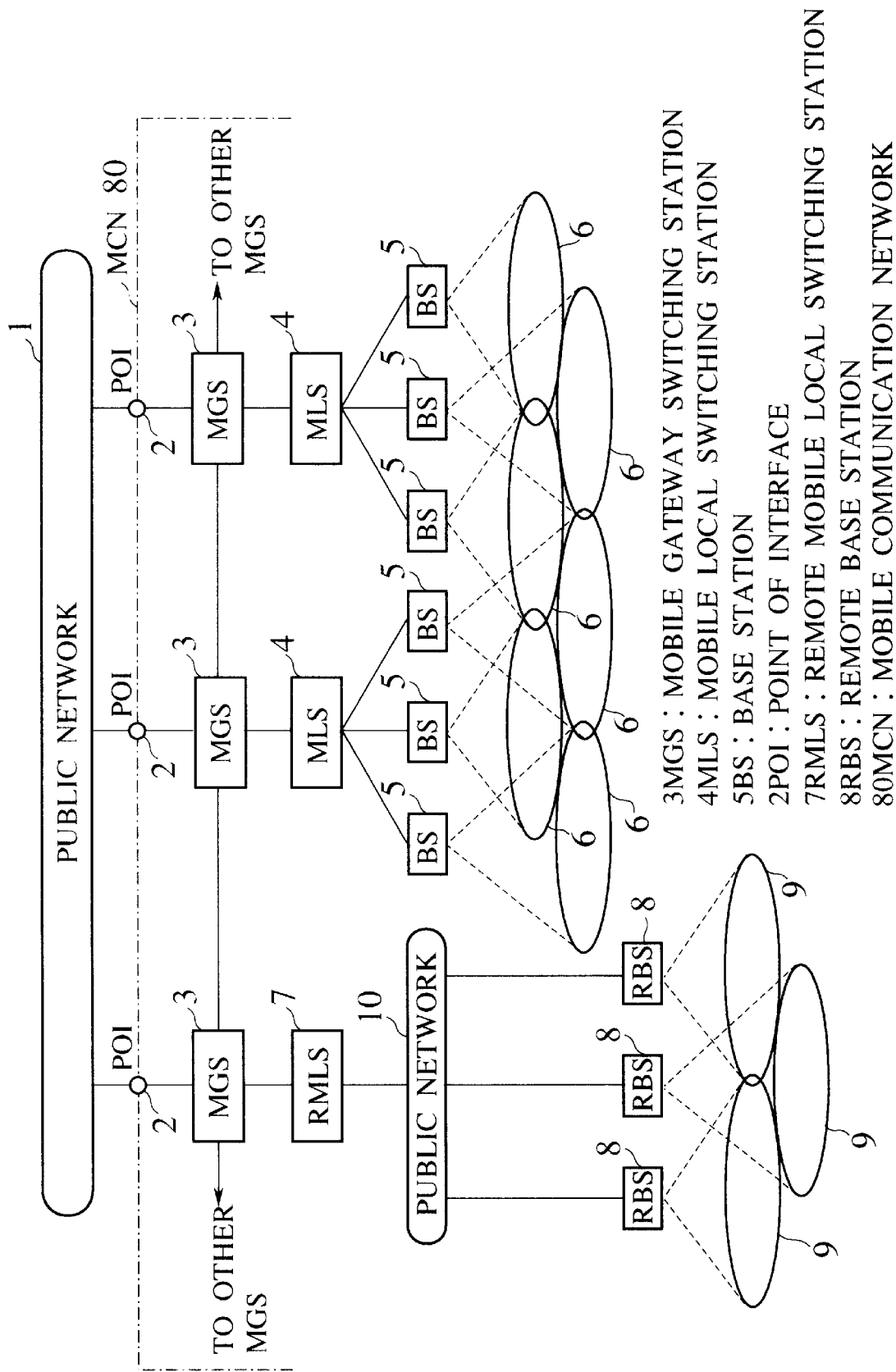
FIG. 2 is a block diagram of a network configuration of a mobile communication system in the first embodiment of the present invention.

FIG. 2 shows a network configuration of the mobile communication system in this first embodiment, where those elements which are substantially equilvalent to the corresponding elements in the conventional configuration of FIG. 1 described above are given the same reference numerals.

In the network configuration of FIG. 2, a mobile communication network (MCN) 80 is connected with a fixedly provided public network 1 through a number of points of interface (POI) 2 at a number of mobile gateway switching stations (MGS) 3. The mobile gateway switching stations 3 are connected with each other, while each mobile gateway switching station 3 but one is also connected with a corresponding mobile local switching station (MLS) 4, and each mobile local switching station 4 is connected with a plurality of base stations (BS) 5. Each base station 5 provides its own zone (communication supported area) 6 and communicates with mobile stations located within its own zone 6.

In addition, one mobile gateway switching station 3 is connected with a remote mobile local switching station (RMLS) 7 for satellite zones, which is connected with remote base stations (RBS) 8 for satellite zones through a public network 10. Each remote base station 8 covers its own satellite zone 9 for providing the mobile communication service in a thinly populated area with a light potential traffic.

Each remote base station 8 can be connected with a communication terminal on the public network 1 by being connected to the remote mobile local switching station 7 through the public network 10, and further to the public network 1 from this remote mobile local switching station 7 through the mobile gateway switching station 3. Each remote base station 8 can also be connected with the base station 5 by being connected to the remote mobile local switching station 7 though the public network 10, and further to the base station 5 from this remote mobile local switching station 7 through the mobile gateway switching stations 3 and the mobile local switching station 4.

The public network 10 is used for connecting the remote base station 8 to the remote mobile local switching station 7 whenever necessary, and can be provided by a network such as ISDN (Integrated Services Digital Netowrk) or analog telephone network. In this first embodiment, a case of using the ISDN as the public network 10 will be described as an example.

In the following, for the sake of explanation, it is assumed that there are three remote base stations 8 as shown in FIG. 2, and a single digital primary rate interface (corresponding to 24 sets of 64 kbps transmission channel) per base station is provided as an interface between the mobile local switching station 4 and the base station 5 as well as an interface between the remote mobile local switching station 7 and the remote base station 8, where one 64 kbps channel is used as a control channel while as many as a necessary number of the remaining channels are used as communication channels. Here, the control channel uses the packet transmission such as LAP-B (Link Access Procedure-Balanced mode), and the control channel utilization rate of the remote base station 8 for the satellite zone with a light traffic is usually very low.

Figure 3:
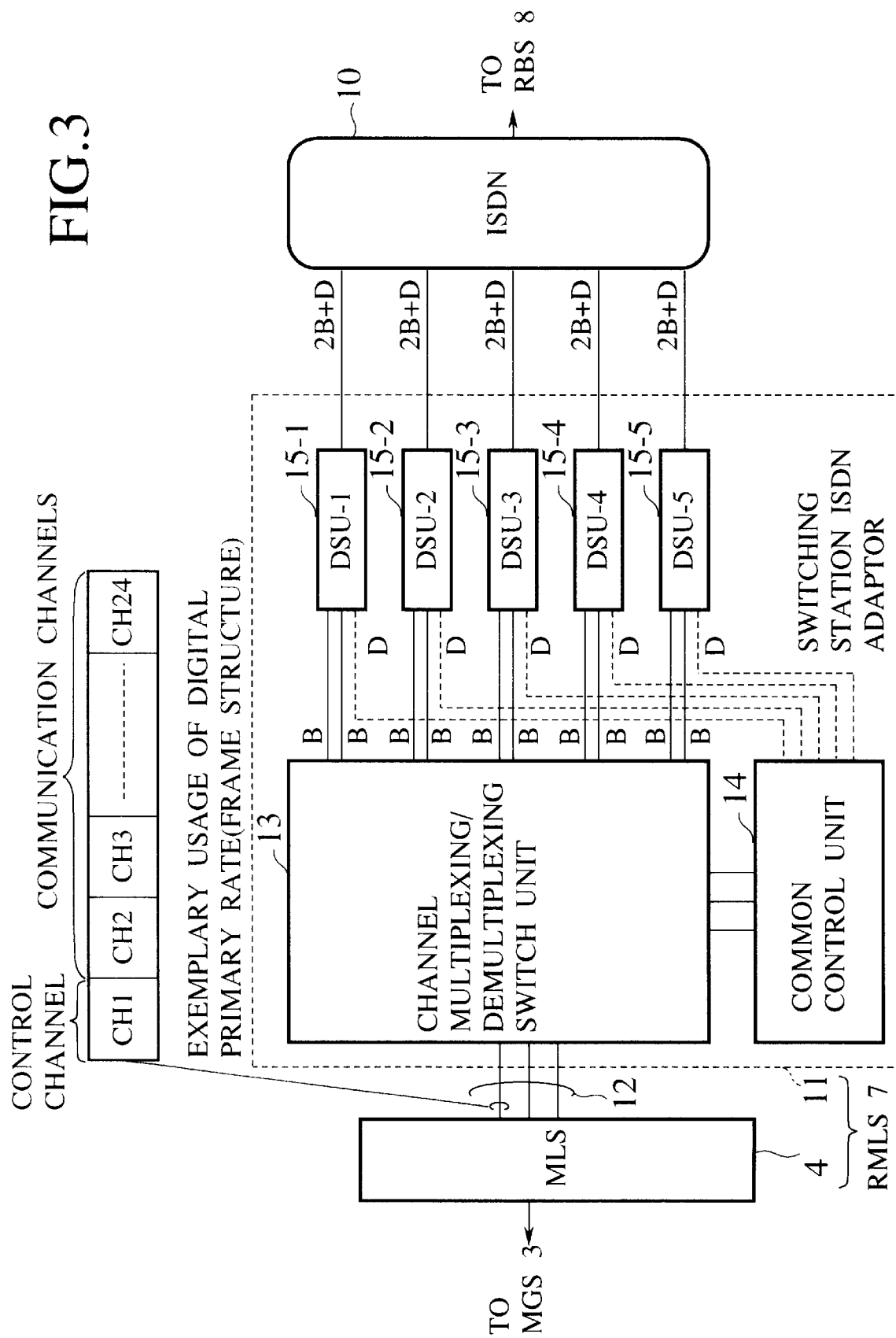
FIG. 3 is a block diagram of a remote mobile local switching station in the mobile communication system of FIG. 2.

The remote mobile local switching station 7 in the mobile communication system of FIG. 2 has a detailed configuration as shown in FIG. 3, which generally comprises a mobile local switching station (MLS) 4 similar to the other usual mobile local switching stations and a switching station ISDN adaptor 11. In FIG. 3, the public network 10 is provided in a form of ISDN as mentioned above. Also, an interface 12 between the mobile local switching station 4 and the switching station ISDN adaptor 11 is provided in a form of three channels of the digital primary rate interface, in correspondence to three remote base stations 8 to be connected through the ISDN 10, as mentioned above.

The switching station ISDN adaptor 11 comprises a channel multiplexing/demultiplexing switch unit 13, a common control unit 14, and a plurality (five in FIG. 3) of digital service units (DSU) 15-1 to 15-5.

The channel multiplexing/demultiplexing switch unit 13 has a function to connect three control channels in the three channels of the digital primary rate interface provided by the interface 12 to the common control unit 14, and remaining communication channels to the DSUs 15-1 to 15-5 according to a command from the common control unit 14. The DSUS 15-1 to 15-5 have a function to connect the remote mobile local switching station 7 to the remote base stations 8 through the ISDN 10.

Here, FIG. 3 is an exemplary case of five DSUs 15-1 to 15-5 using five channels of INSnet64. As indicated in FIG. 3, each INSnet64 channel has an ability to transmit two B-channels (64 kbps) and one D-channel (16 kbps). Among the DSUs 15-1 to 15-5, three DSU-1 to DSU-3 (15-1 to 15-3) are to be exclusively used for the respective three remote base stations 8, while the other two DSU-4 and DSU-5 (15-4 and 15-5) are to be used to allocate additional channels according to the traffic. In other words, a destination address of a station to be connected by each of DSU-1 to DSU-3 (15-1 to 15-3) is fixedly allocated, while a destination address of a station to be connected by each of DSU-4 and DSU-5 (15-4 and 15-5) is dynamically specified by the common control unit 14 as will be described below.

The common control unit 14 has functions to anaylze control data of three control channels and manage the operation sequence, to control and manage-the DSUs 15-1 to 15-5, and to manage the remote base stations 8. This common control unit 14 carries out the communication channel connection control according to the control data of the control channels. In this configuration, the control data of three control channels are loaded in packets of D-channels accommodated by the respective DSU-1 to DSU-3 (151 to 15-3) and fixedly connected with the corresponding remote base stations 8. The signal rate of the D-channel is 16 kbps, which is ¼ of 64 kbps of the control channel, but an amount of the control data to be given to the remote base station 8 for the satellite zone with a light traffic is sufficiently small for handling by the D-channel packets.

Figure 4:
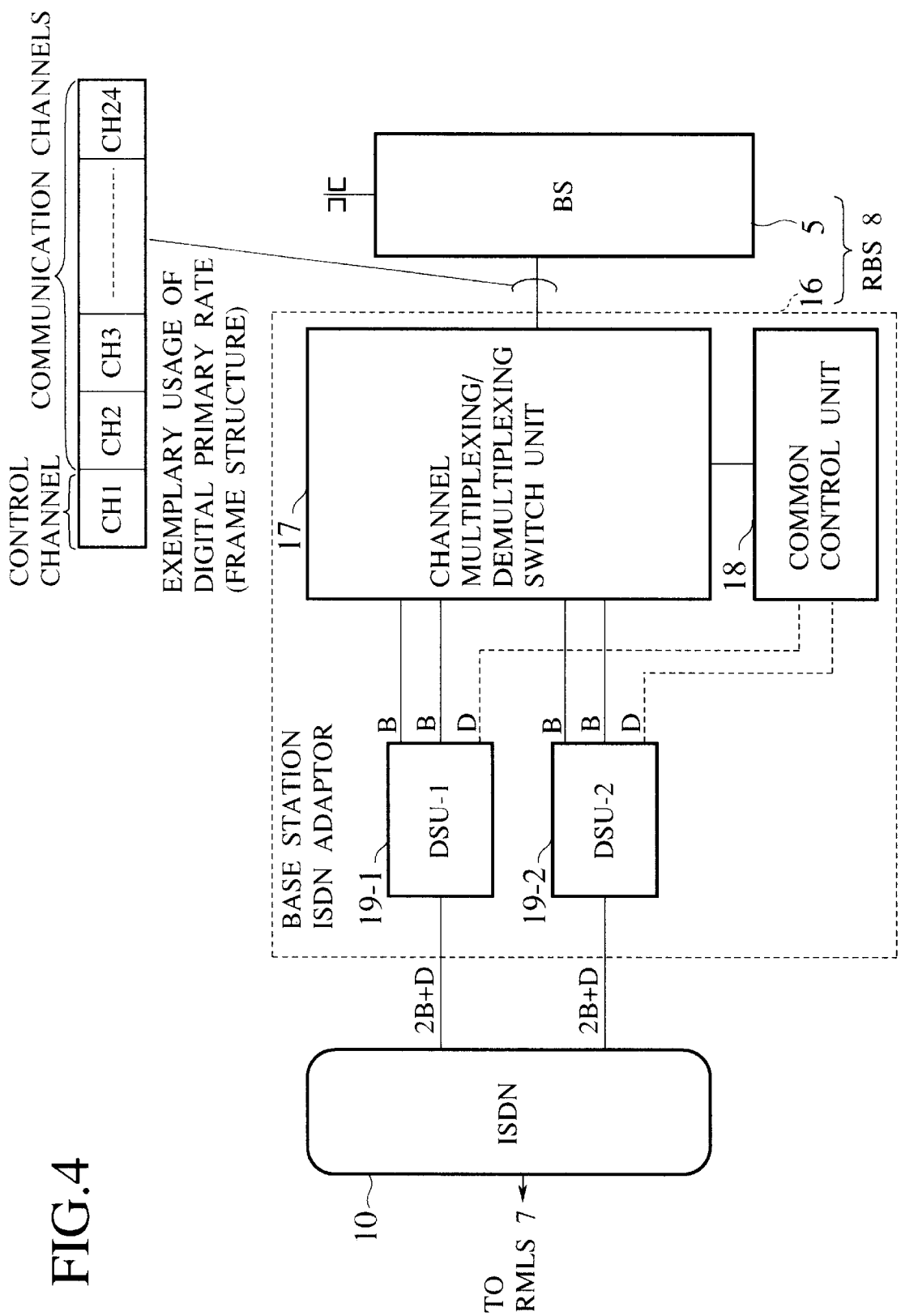
FIG. 4 is a block diagram of a remote base station in the mobile communication system of FIG. 2.

On the other hand, the remote base station 8 in the mobile communication system of FIG. 2 has a detailed configuration as shown in FIG. 4, which generally comprises a base station (BS) 5 similar to the other usual base stations 5 and a base station ISDN adaptor 16. In FIG. 4, the public network 10 is provided in a form of ISDN, as mentioned above. Also, an interface between the base station 5 and the base station ISDN adaptor 16 is provided in a form of a single channel of the digital primary rate interface, as mentioned above.

The base station ISDN adaptor 16 comprises a channel multiplexing/demultiplexing switch unit 17, a common control unit 18, and a plurality (two in FIG. 4) of digital service units (DSU) 19-1 to 19-2.

The channel multiplexing/demultiplexing switch unit 17 has a function to connect a control channel in the single channel of the digital primary rate interface to the common control unit 18, and remaining communication channels to the DSUs 19-1 to 19-2 according to a command from the common control unit 18. The DSUS 19-1 to 19-2 have a function to connect the remote base station 8 to the remote mobile local switching station 7 through the ISDN 10.

Here, FIG. 4 is an exemplary case of two DSUs 19-1 to 19-2 using two channels of INSnet64. Among the DSUs 19-1 to 19-2, the DSU-1 (19-1) is to be connected with the fixedly allocated part of the DSUs 15-1 to 15-5 of the remote mobile local switching station 7 (i.e., one of DSU-1 to DSU-3 (15-1 to 15-3)), while the other DSU-2 (19-2) is to be connected with the traffic dependent part of the DSUs 15-1 to 15-5 of the remote mobile local switching station 7 (i.e., any of DSU-4 and DSU-5 (15-4 and 15-5)).

The common control unit 18 has functions to anaylze control data of the control channel and manage the operation sequence, and to control and manage the DSUs 19-1 to 19-2. This common control unit 18 carries out the communication channel connection control according to the control data of the control channel. In this configuration, the control data of the control channel is loaded in packets of D-channel accommodated by the DSU-1 (19-1) and fixedly connected with the corresponding DSU of the remote mobile local switching station 7.

Next, the operations of the remote mobile local switching station 7 and the remote base station 8 in the mobile communication system of FIG. 2 will be described with references to the sequence charts of FIG. 5 to FIG. 8. Note that the operations of the other elements in the mobile communication system of FIG. 2 are substantially equivalent as those in the conventional mobile communication system of FIG. 1.

Figure 5:
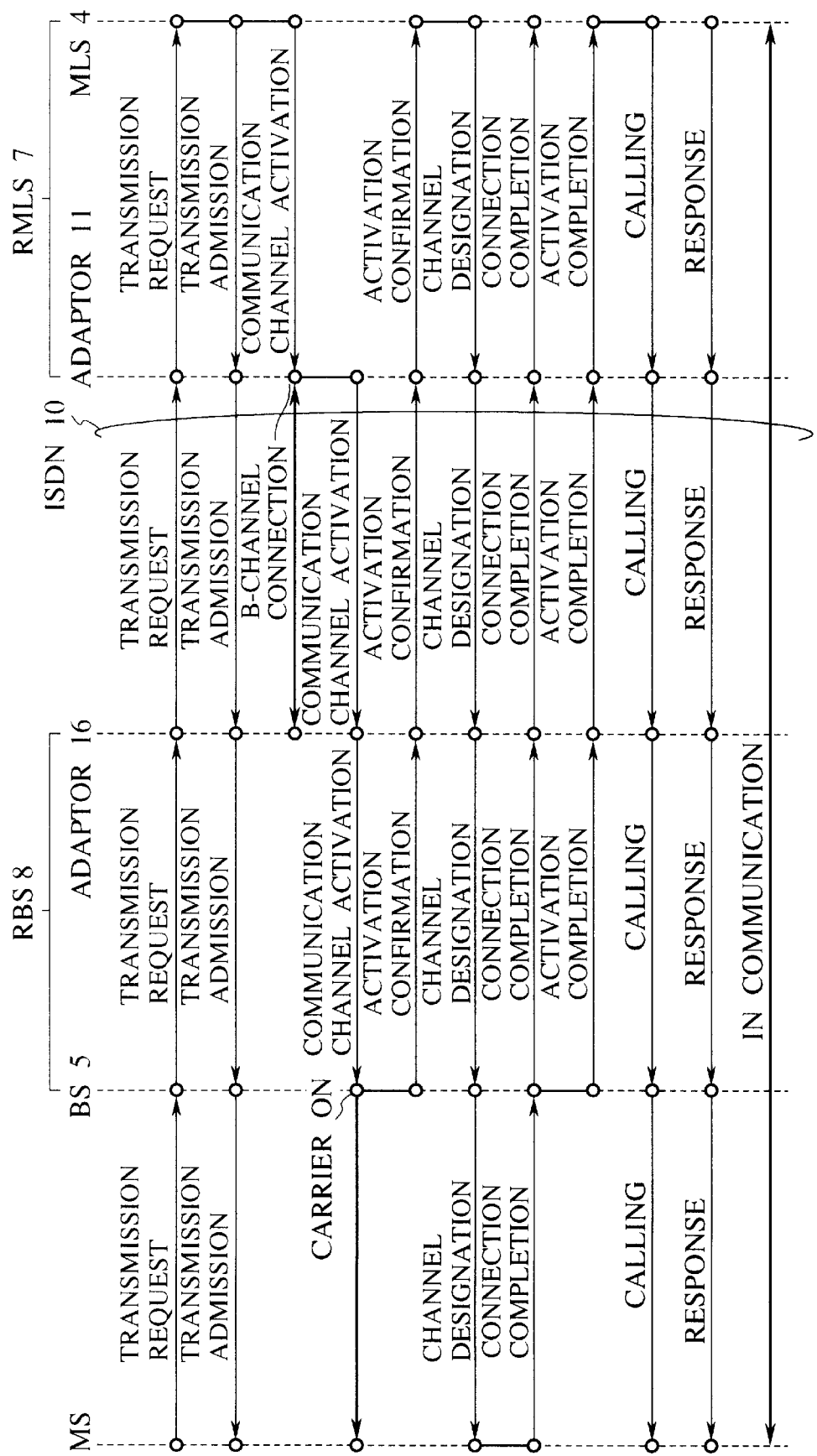
FIG. 5 is a sequence chart for a transmission sequence in the mobile communication system of FIG. 2.

First, the transmission sequence is carried out according to the sequence chart of FIG. 5 as follows.

When a "transmission request" is issued from a mobile station, this "transmission request" is admitted at the mobile local switching station 4 of the remote mobile local switching station 7 through the base station 5 and the base station ISDN adaptor 16 of the remote base station 8, the ISDN 10, and the switching station ISDN adaptor 11 of the remote mobile local switching station 7.

Then, the mobile local switching station 4 returns a "transmission admission" to the mobile station via the same route in the opposite direction, and returns a "communication channel activation" for activating communication channels to the switching station ISDN adaptor 11.

When this "communication channel activation" is received, the switching station ISDN adaptor 11 activates an appropriate DSU to connect the B-channel to a specified remote base station 8, and connects this B-channel with a specified communication channel of the digital primary rate interface. Then, the switching station ISDN adaptor 11 relays the "communication channel activation" received from the mobile local switching station 4 to the remote base station 8 side.

At the remote base station 8 side, the base station ISDN adaptor 16 receives this "communication channel activation", and determines a connection between the B-channel connected upon receiving the "communication channel activation" and the digital primary rate interface. The base station 5 then activates a specified communication channel according to the received "communication channel activation" (carrier on).

Thereafter, the transmission sequence continues to carry out the operations similar to the usual transmission sequence, including a sending of an "activation confirmation" from the base station 5 to the mobile local switching station 4, a sending of a "channel designation" from the mobile local switching station 4 to the mobile station, a sending of a "connection completion" from the mobile station to the mobile local switching station 4, a sending of an "activation completion" from the base station 5 to the mobile local switching station 4, a sending of a "calling" from the mobile local switching statation 4 to the mobile station, and a sending of a "response" from the mobile local switching station 4 to the mobile station, so as to put the mobile station in communication through the remote base station 8, the ISDN 10, and the remote mobile local switching station 7.

Figure 6:
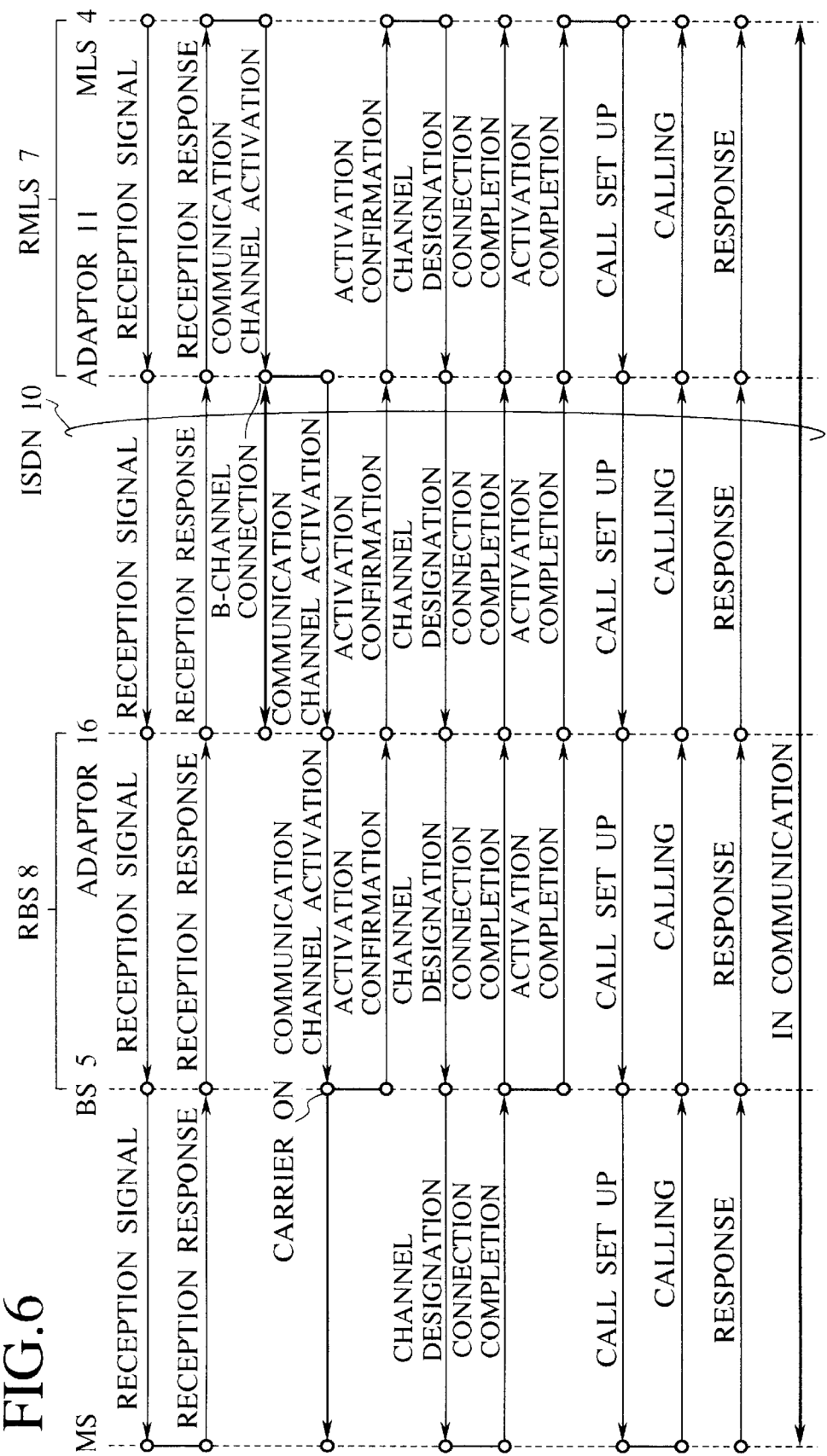
FIG. 6 is a sequence chart for a reception sequence in the mobile communication system of FIG. 2.

Next, the reception sequence is carried out according to the sequence chart of FIG. 6 as follows.

When a "reception signal" is transmitted from the remote mobile local switching station 7 to the mobile station through the ISDN 10 and the remote base station 8, the mobile station issues a "reception response" with respect to the "reception signal", and this "reception response" is returned to the remote mobile local switching station 7 through the remote base station 8 and the ISDN 10.

When this "reception response" is received, the mobile local switching station 4 of the remote mobile local switching station 7 returns a "communication channel activation" for activating communication channels to the switching station ISDN adaptor 11.

When this "communication channel activation" is received, the switching station ISDN adaptor 11 activates an appropriate DSU to connect the B-channel to a specified remote base station 8, and connects this B-channel with a specified communication channel of the digital primary rate interface. Then, the switching station ISDN adaptor 11 relays the "communication channel activation" received from the mobile local switching station 4 to the remote base station 8 side.

At the remote base station 8 side, the base station ISDN adaptor 16 receives this "communication channel activation", and determines a connection between the B-channel connected upon receiving the "communication channel activation" and the digital primary rate interface. The base station 5 then activates a specified communication channel according to the received "communication channel activation" (carrier on).

Thereafter, the reception sequence continues to carry out the operations similar to the usual reception sequence, including a sending of an "activation confirmation" from the base station 5 to the mobile local switching station 4, a sending of a "channel designation" from the mobile local switching station 4 to the mobile station, a sending of a "connection completion" from the mobile station to the mobile local switching station 4, a sending of an "activation completion" from the base station 5 to the mobile local switching station 4, a sending of a "call set up" from the mobile local switching station 4 to the mobile station, a sending of a "calling" from the mobile station to the mobile local switching station 4, and a sending of a "response" from the mobile station to the mobile local switching station 4, so as to put the mobile station in communication through the remote base station 8, the ISDN 10, and the remote mobile local switching station 7.

Figure 7:
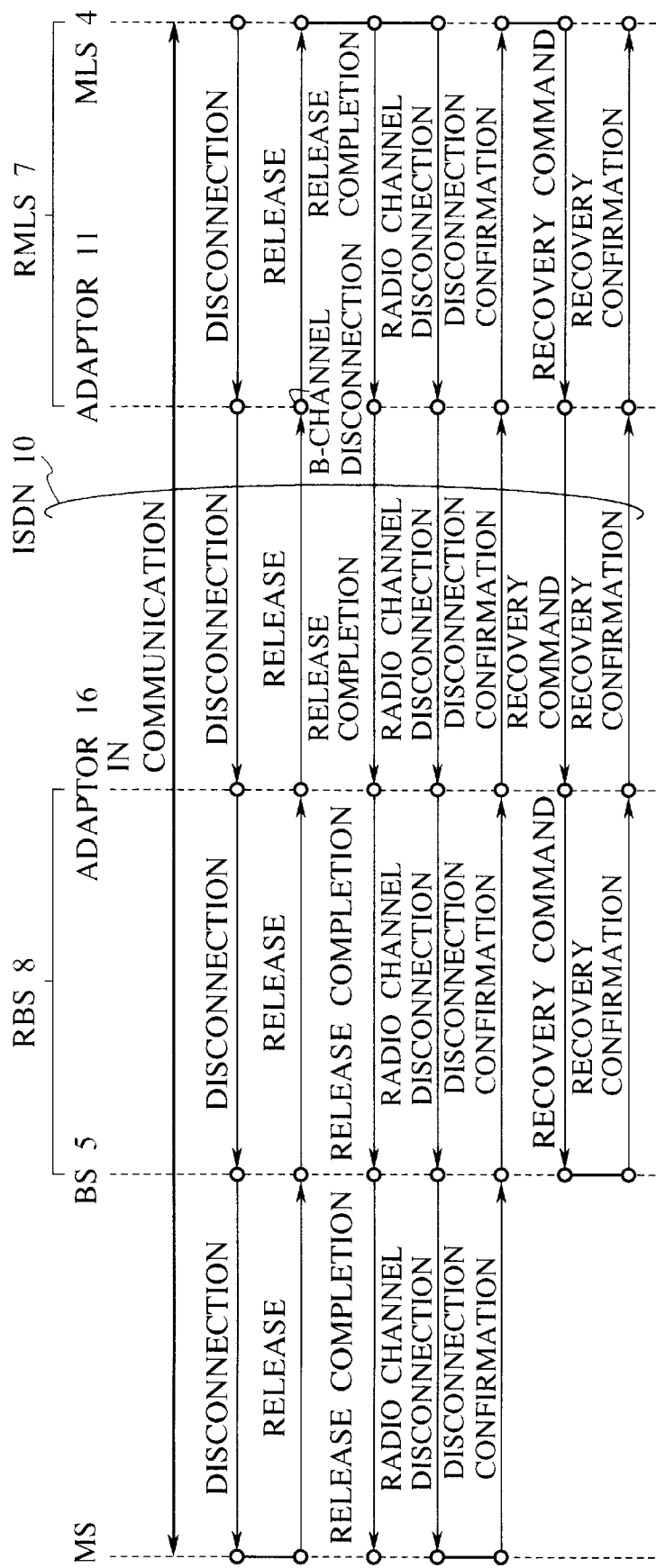
FIG. 7 is a sequence chart for a call termination sequence initiated from a network side in the mobile communication system of FIG. 2.

Next, a call termination sequence initiated from the network side is carried out according to the sequence chart of FIG. 7 as follows.

While the mobile station is in communication, when a "disconnection" for terminating a call processing operation is transmitted from the mobile local switching station 4 of the remote mobile local switching station 7 to the mobile station through the ISDN 10 and the remote base station 8, the mobile station returns a "release" to the mobile local switching station 4 via the same route in the opposite direction, so as to disconnect the B-channel.

Then, the mobile local switching station 4 transmits a "release completion" to the mobile station through the ISDN 10 and the remote base station 8.

Thereafter, the call termination sequence continues to carry out the operations similar to the usual call termination sequence, including a sending of a "radio channel disconnection" for releasing the mobile station from the mobile local switching station 4 to the mobile station, a sending of a "disconnection confirmation" from the mobile station to the mobile local switching station 4, a sending of an "recovery command" for releasing the base station 5 from the mobile local switching station 4 to the base station 5, and a sending of a "recovery confirmation" from the base station 5 to the mobile local switching station 4.

Here, the only difference from the usual call termination sequence is that the switching station ISDN adaptor 11 releases a specified B-channel when the "release completion" is received from mobile local switching station 4.

Figure 8:
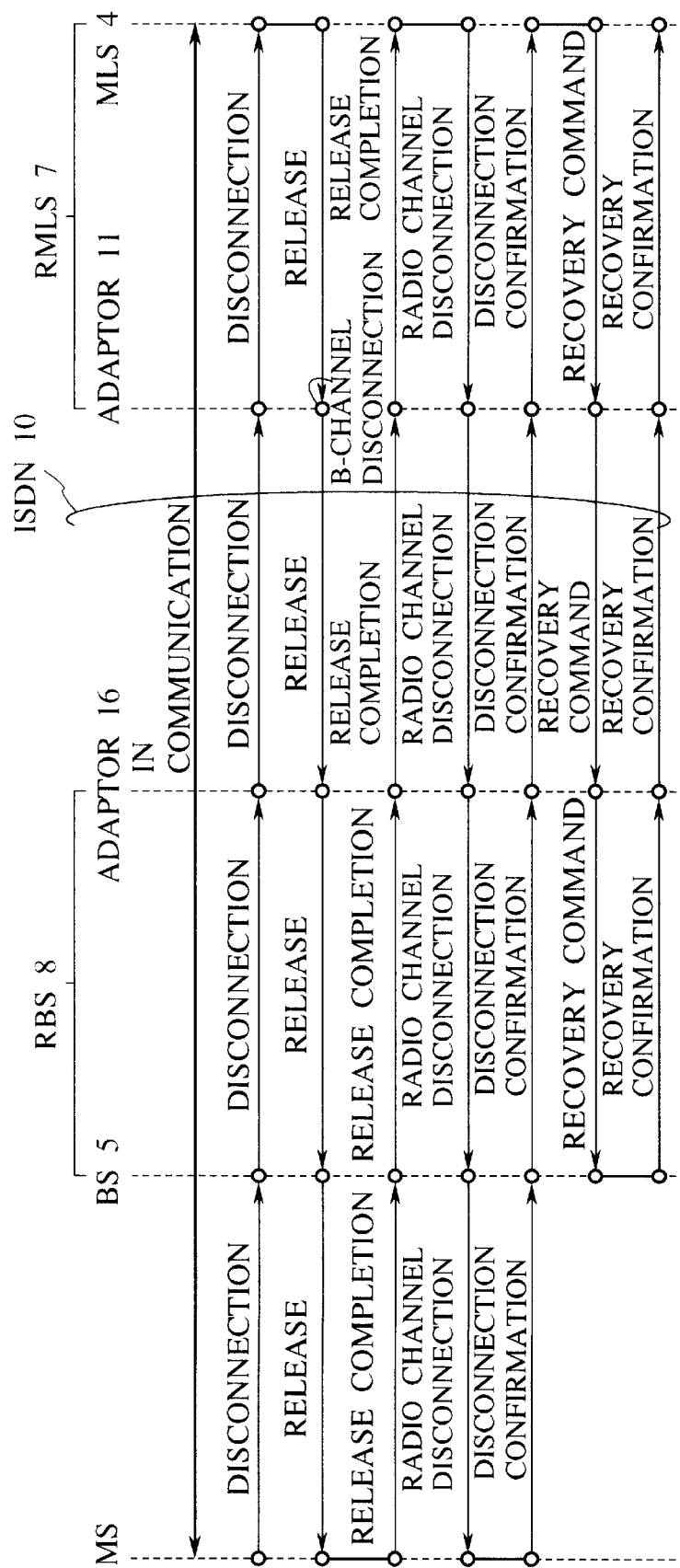
FIG. 8 is a sequence chart for a call termination sequence initiated from a mobile station side in the mobile communication system of FIG. 2.

Next, a call termination sequence initiated from the mobile station side is carried out according to the sequence chart of FIG. 8 as follows.

While the mobile station is in communication, when a "disconnection" for terminating a call processing operation is transmitted from the mobile station to the mobile local switching station 4 of the remote mobile local switching station 7 through the ISDN 10 and the remote base station 8, the mobile local switching station 4 returns a "release" to the mobile station via the same route in the opposite direction, so as to disconnect the B-channel.

Then, the mobile station transmits a "release completion" to the mobile local switching station 4 through the ISDN 10 and the remote base station 8.

Thereafter, the call termination sequence continues to carry out the operations similar to the usual call termination sequence, including a sending of a "radio channel disconnection" for releasing the mobile station from the mobile local switching station 4 to the mobile station, a sending of a "disconnection confirmation" from the mobile station to the mobile local switching station 4, a sending of an "recovery command" for releasing the base station 5 from the mobile local switching station 4 to the base station 5, and a sending of a "recovery confirmation" from the base station 5 to the mobile local switching station 4.

Here, the only difference from the usual call termination sequence is that the switching station ISDN adaptor 11 releases a specified B-channel when the "release completion" is received from mobile station.

As described, according to this first embodiment, the remote base station and the remote mobile local switching station are capable of being connected to the communication network such as ISDN by means of the respective digital service units, and the remote base station and the remote mobile local switching station can be connected with each other through the communication network such as ISDN only when it is necessary to connect the remote base station to the mobile communication network.

Consequently, the thinly populated satellite zones which are scattered at various regions can be accommodated in a single remote mobile local switching station, and therefore a cost required for additional switching stations and land transmission paths at a time of service area expansion can be reduced considerably.

Also, the communication channel for connecting the remote base station and the remote mobile local switching station is to be set up according to the need, so that it is possible to reduce a cost for the transmission path further.

In addition, it suffices to provide the digital service units in the remote base station and the remote mobile local switching station, and the conventional interface between the base station and the mobile local switching station can be easily modified to add the functions of the digital service units at interface sections without any fundamental changes, so that there is no need to develop totally new base station and mobile local switching station for the satellite zones.

It is to be noted that, in the first embodiment described above, the public network 1 and the public network 10 shown in FIG. 2 may be provided by the same network, if desired.

Referring now to FIG. 9 to FIG. 15, the second embodiment of the service area expansion scheme for a mobile communication system according to the present invention will be described in detail.

Figure 9:
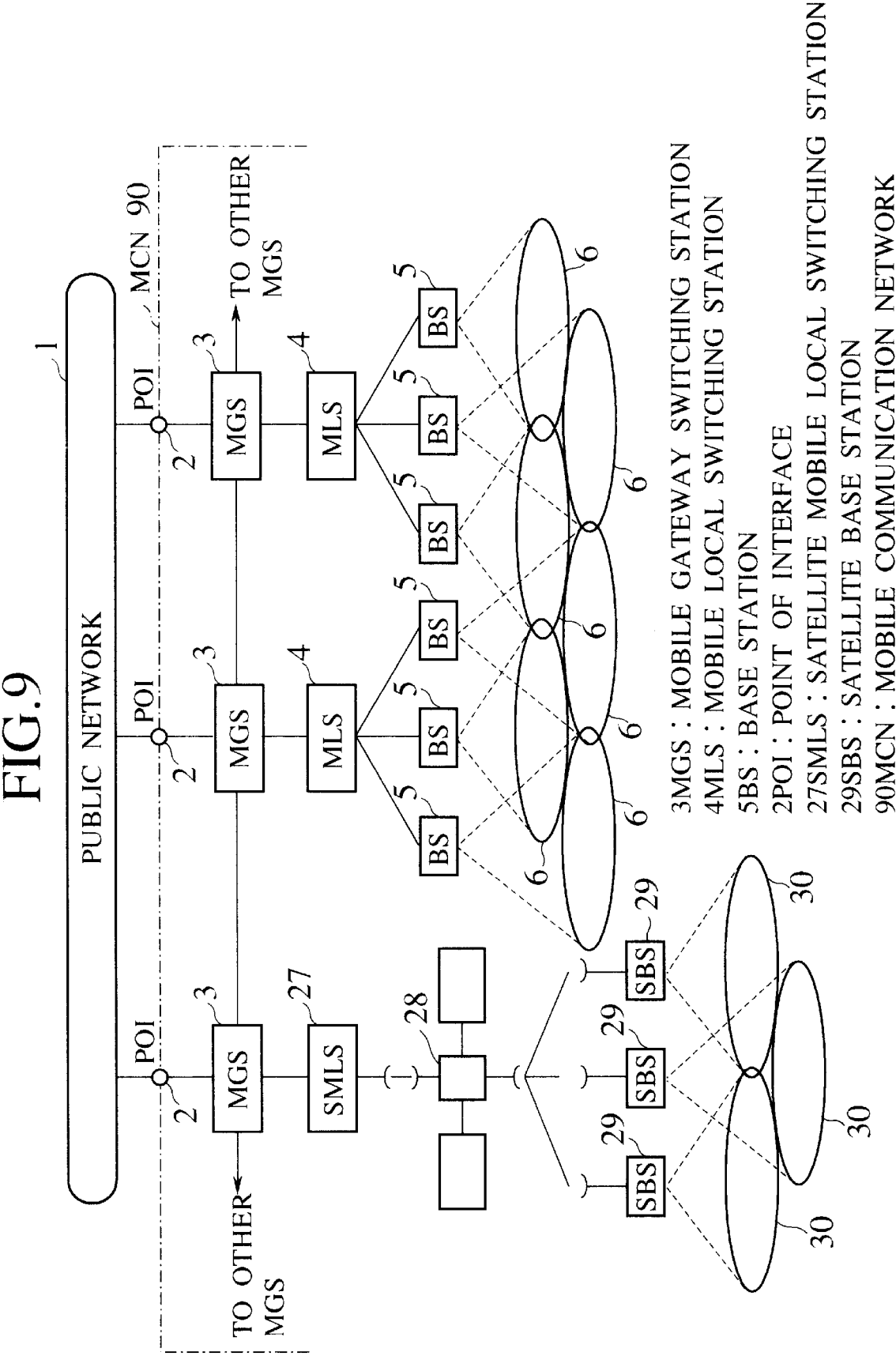
FIG. 9 is a block diagram of a network configuration of a mobile communication system in the second embodiment of the present invention.

FIG. 9 shows a network configuration of the mobile communication system in this second embodiment, where those elements which are substantially equilvalent to the corresponding elements in the conventional configuration of FIG. 1 described above are given the same reference numerals.

In the network configuration of FIG. 9, a mobile communication network (MCN) 90 is connected with a fixedly provided public network 1 through a number of points of interface (POI) 2 at a number of mobile gateway switching stations (MGS) 3. The mobile gateway switching stations 3 are connected with each other, while each mobile gateway switching station 3 but one is also connected with a corresponding mobile local switching station (MLS) 4, and each mobile local switching station 4 is connected with a plurality of base stations (BS) 5. Each base station 5 provides its own zone (communication supported area) 6 and communicates with mobile stations located within its own zone 6.

In addition, one mobile gateway switching station 3 is connected with a satellite mobile local switching station (SMLS) 27 for satellite zones, which is connected with satellite base stations (SBS) 29 for satellite zones through a satellite 28. Each satellite base station 29 covers its own satellite zone 30 for providing the mobile communication service in a thinly populated area with a light potential traffic.

Each satellite base station 29 can be connected with a communication terminal on the public network 1 by being connected to the satellite mobile local switching station 27 through the satellite 28, and further to the public network 1 from this satellite mobile local switching station 27 through the mobile gateway switching station 3. Each remote base station 8 can also be connected with the base station 5 by being connected to the satellite mobile local switching station 27 through the satellite 28, and further to the base station 5 from this satellite mobile local switching station 27 through the mobile gateway switching stations 3 and the mobile local switching station 4.

In the following, for the sake of explanation, it is assumed that there are three satellite base stations 29 as shown in FIG. 9, and a single digital primary rate interface (corresponding to 24 sets of 64 kbps transmission channel) per base station is provided as an interface between the mobile local switching station 4 and the base station 5 as well as an interface between the satellite mobile local switching station 27 and the satellite base station 29, where one 64 kbps channel is used as a control channel while as many as a necessary number of the remaining channels are used as communication channels.

Figure 10:
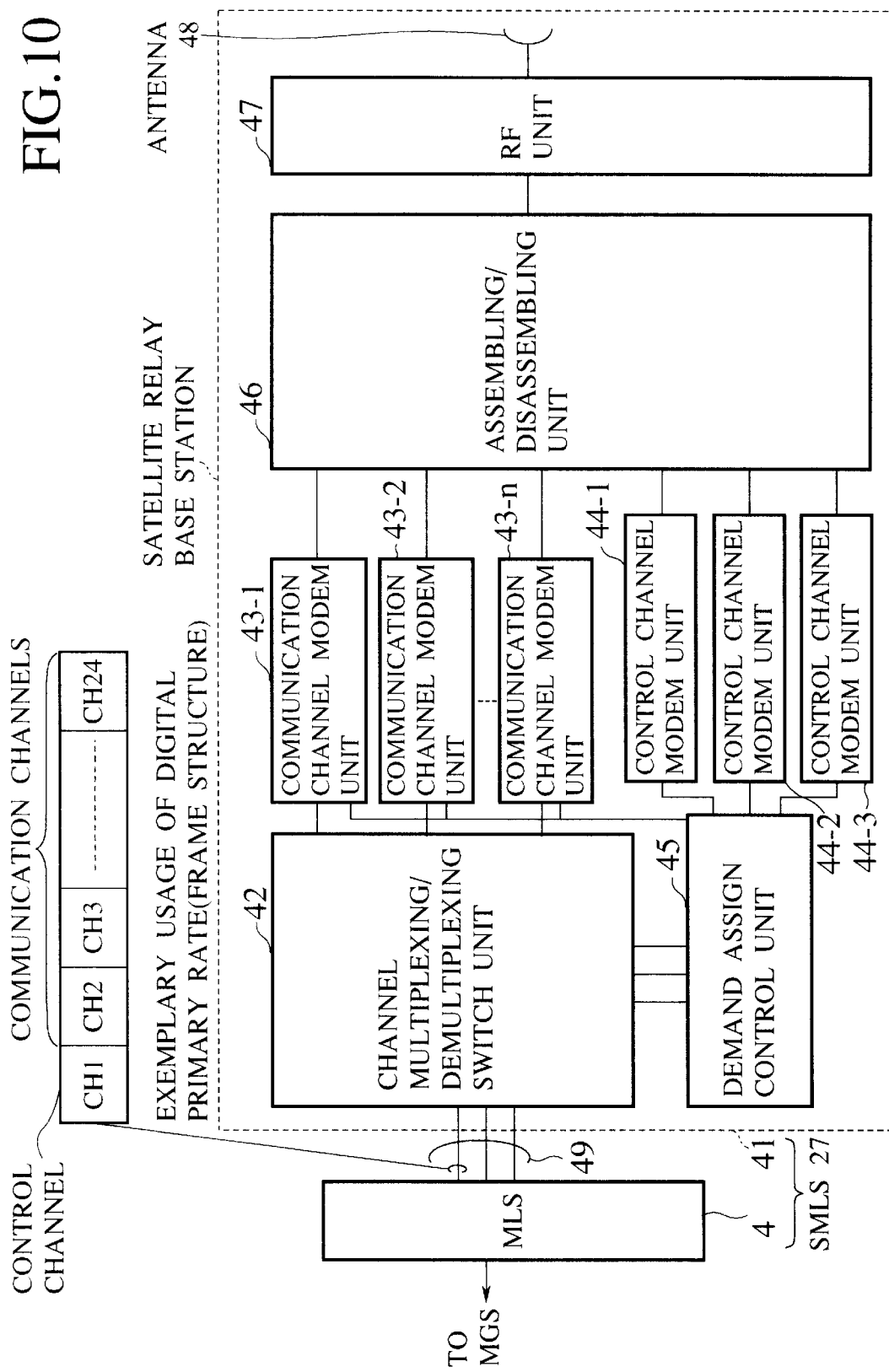
FIG. 10 is a block diagram of a satellite mobile local switching station in the mobile communication system of FIG. 9.

The satellite mobile local switching station 27 in the mobile communication system of FIG. 9 has a detailed configuration as shown in FIG. 10, which generally comprises a mobile local switching station (MLS) 4 similar to the other usual mobile local switching stations and a satellite relay base station 41. In FIG. 10, an interface 49 between the mobile local switching station 4 and the satellite relay base station 41 is provided in a form of three channels of the digital primary rate interface, in correspondence to three satellite base stations 29 to be connected through the satellite 28, as mentioned above.

The satellite relay base station 41 comprises a channel multiplexing/demultiplexing switch unit 42, a plurality of communication channel modem units 43-1 to 43-n, thee control channel modem units 44-1 to 44-3 in correspondence to three satellite base stations 29, a demand assign control unit 45, an assembling/disassembling unit 46, and RF unit 47, and an antenna unit 48.

The channel multiplexing/demultiplexing switch unit 42 has a function to connect three control channels in the three channels of the digital primary rate interface provided by the interface 49 to the demand assign control unit 45, and remaining communication channels to the communication channel modem units 43-1 to 43-n according to a command from the demand assign control unit 45.

The demand assign control unit 45 has functions to anaylze control data of three control channels and manage the operation sequence, to control and manage the communication channel modem units 43-1 to 43-n, and to manage the satellite base stations 29. This demand assign control unit 45 carries out the satellite channel assignment in a manner of demand assign according to the control data of the control channels. Here, the satellite channels for three control channels are set up in a manner of pre-assign by three control channel modem units 44-1 to 44-3.

The assembling/disassembling unit 46 assembls output signals in forms of mutually different carriers from the communication channel modem units 43-1 to 43-n and the control channel modem units 44-1 to 44-3 and supplies the assembled signal to the RF unit 47, and disassembles a signal from the RF unit 47 into different carrier frequency components and supplies the disassembled carrier frequency components to the communication channel modem units 43-1 to 43-n and the control channel modem units 44-1 to 44-3.

The transmission signals from the RF unit 47 are transmitted from the antenna unit 48 to the satellite 28, while the reception signals from the satellite 28 are received by the antenna unit 48 and supplied to the RF unit 47.

Figure 11:
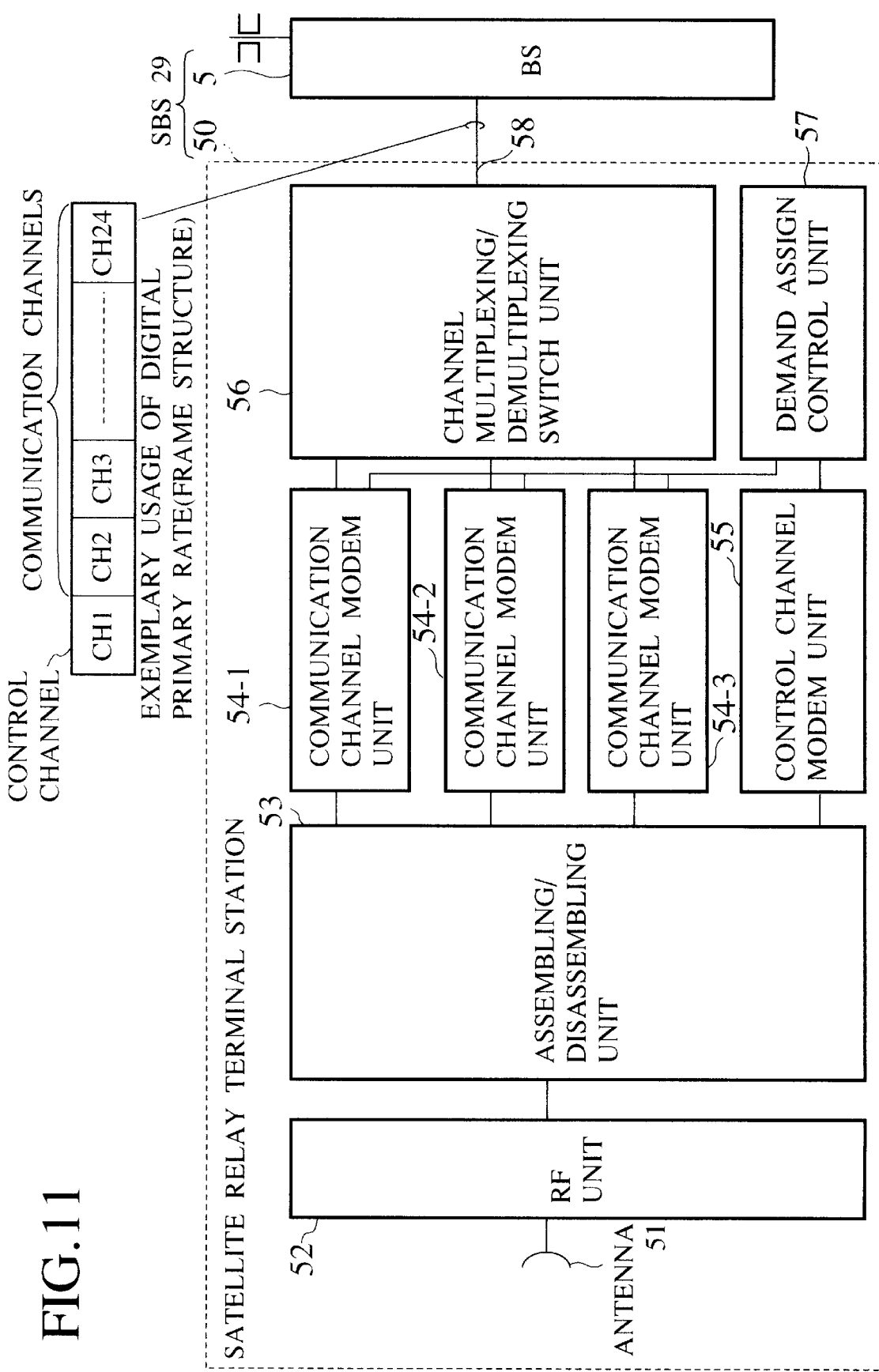
FIG. 11 is a block diagram of a satellite base station in the mobile communication system of FIG. 9.

On the other hand, the satellite base station 29 in the mobile communication system of FIG. 9 has a detailed configuration as shown in FIG. 11, which generally comprises a base station (BS) 5 similar to the other usual base stations 5 and a satellite relay terminal station 50. In FIG. 11, an interface between the base station 5 and the satellite relay terminal station 50 is provided in a form of a single channel of the digital primary rate interface, as mentioned above.

The satellite relay terminal station 50 comprises an antenna unit 51, an RF unit 52, an assembling/disassembling unit 53, a plurality (three in FIG. 11) of communication channel modem units 54-1 to 54-3, a control channel modem unit 55, a channel multiplexing/demultiplexing switch unit 56, and a demand assign control unit 57. This FIG. 11 shows an exemplary case in which the base staiton 5 can use three communication channels.

The demand assign control unit 57 has functions to anaylze control data of the control channel handled by the control channel modem unit 55 and manage the operation sequence, and to control and manage the communication channel modem units 54-1 to 54-3. This demand assign control unit 57 carries out the satellite channel set up and release in a manner of demand assign according to the control data of the control channel.

The channel multiplexing/demultiplexing switch unit 56 has a function to connect the control channel in the single channel of the digital primary rate interface to the demand assign control unit 57, and remaining communication channels to the communication channel modem units 54-1 to 54-3 according to a command from the demand assign control unit 57.

The assembling/disassembling unit 53 assembls output signals in forms of mutually different carriers from the communication channel modem units 54-1 to 54-3 and the control channel modem unit 55 and supplies the assembled signal to the RF unit 52, and disassembles a signal from the RF unit 52 into different carrier frequency components and supplies the disassembled carrier frequency components to the communication channel modem units 54-1 to 54-3 and the control channel modem unit 55.

The transmission signals from the RF unit 52 are transmitted from the antenna unit 51 to the satellite 28, while the reception signals from the satellite 28 are received by the antenna unit 51 and supplied to the RF unit 52.

Next, the operations of the satellite mobile local switching station 27 and the satellite base station 29 in the mobile communication system of FIG. 9 will be described with references to the sequence charts of FIG. 12 to FIG. 15. Note that the operations of the other elements in the mobile communication system of FIG. 9 are substantially equivalent as those in the conventional mobile communication system of FIG. 1. In the following, the control signals between the satellite relay base station 41 and the satellite relay terminal station 50 are relayed by the pre-assigned control channel modem units 44-1 to 44-3 and 55 as described above.

Figure 12:
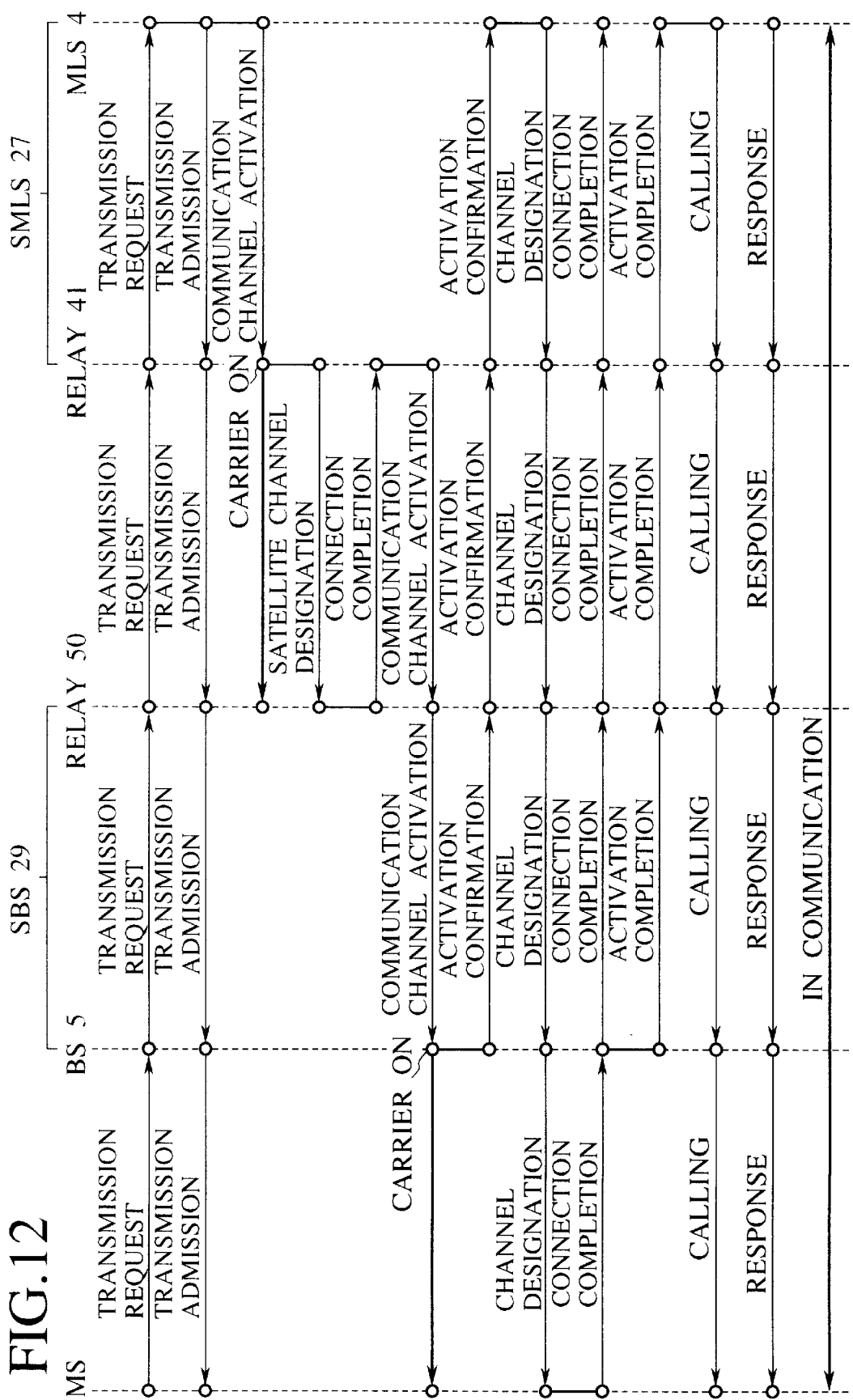
FIG. 12 is a sequence chart for a transmission sequence in the mobile communication system of FIG. 9.

First, the transmission sequence is carried out according to the sequence chart of FIG. 12 as follows.

When a "transmission request" is issued from a mobile station, this "transmission request" is notified to the mobile local switching station 4 of the satellite mobile local switching station 27 through the satellite base station 29, the satellite 28 (control channel), and the satellite relay base station 41 of the satellite mobile local switching station 27.

Then, the mobile local switching station 4 returns a "transmission admission" to the mobile station via the same route in the opposite direction, and returns a "communication channel activation" for activating communication channels to the satellite relay base station 41.

When this "communication channel activation" is received, the satellite relay base station 41 determines an available frequency in the satellite channel and activates the corresponding communication channel modem unit 43 (a specific one of the communication channel modem units 43-1 to 43-n)(carrier on), and then connects the activated communication channel modem unit 43 with a specified communication channel of the digital primary rate interface which is connected with the channel multiplexing/demultiplexing unit 42, and transmits the corresponding frequency data by a "satellite channel designation" to the corresponding satellite relay terminal station 50.

The satellite relay terminal station 50 then activates the communication channel modem unit 54 usable in the specified frequency (carrier on, reception synchronization establishing), and when the activation of this communication channel modem unit 54 is completed, returns a "connection completion" to the satellite relay base station 41.

When this "connection completion" is received, the satellite relay base station 41 confirms the synchronization establishing at the communication channel modem unit 43, and relays the "communication channel activation" received from the mobile local switching station 4 to the satellite base station 29 side.

At the satellite base station 29 side, the satellite relay terminal station 50 receives this "communication channel activation", and determines a connection between the communication channel modem unit 54 and the digital primary rate interface. The base station 5 then activates a specified communication channel according to the received "communication channel activation" (carrier on).

Thereafter, the transmission sequence continues to carry out the operations similar to the usual transmission sequence, including a sending of an "activation confirmation" from the base station 5 to the mobile local switching station 4, a sending of a "channel designation" from the mobile local switching station 4 to the mobile station, a sending of a "connection completion" from the mobile station to the mobile local switching station 4, a sending of an "activation completion" from the base station 5 to the mobile local switching station 4, a sending of a "calling" from the mobile local switching station 4 to the mobile station, and a sending of a "response" from the mobile local switching station 4 to the mobile station, so as to put the mobile station in communication through the satellite base station 29, the satellite 28, and the satellite mobile local switching station 27.

Figure 13:
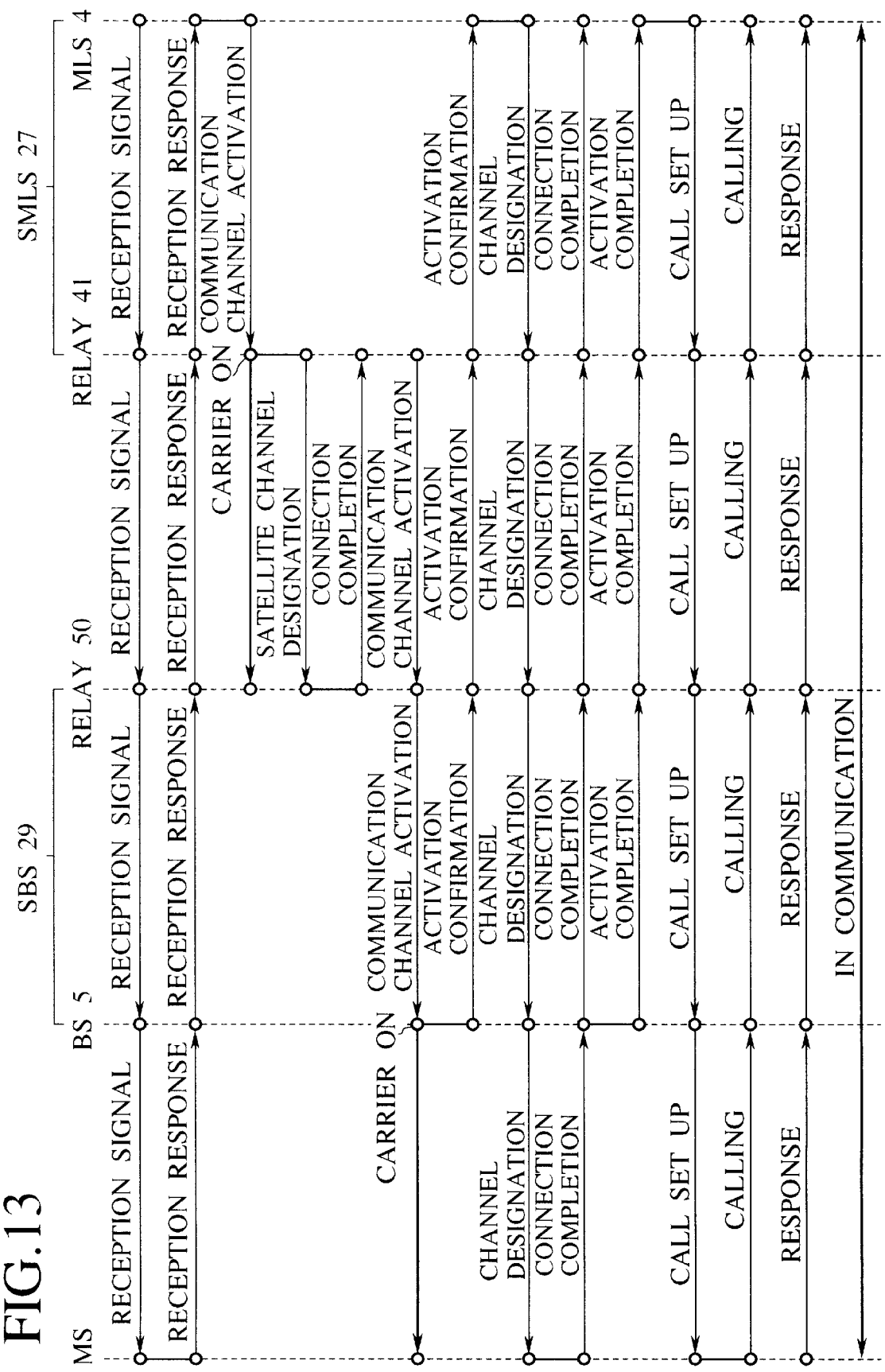
FIG. 13 is a sequence chart for a reception sequence in the mobile communication system of FIG. 9.

Next, the reception sequence is carried out according to the sequence chart of FIG. 13 as follows.

When a "reception signal" is transmitted from the satellite mobile local switching station 27 to the mobile station through the satellite 28 and the satellite base station 29, the mobile station issues a "reception response" with respect to the "reception signal", and this "reception response" is returned to the satellite mobile local switching station 27 through the satellite base station 29 and the satellite 28.

When this "reception response" is received, the mobile local switching station 4 of the satellite mobile local switching station 27 returns a "communication channel activation" for activating communication channels to the satellite relay base station 41.

When this "communication channel activation" is received, the satellite relay base station 41 determines an available frequency in the satellite channel and activates the corresponding communication channel modem unit 43 (a specific one of the communication channel modem units 43-1 to 43-n)(carrier on), and then connects the activated communication channel modem unit 43 with a specified communication channel of the digital primary rate interface which is connected with the channel multiplexing/demultiplexing unit 42, and transmits the corresponding frequency data by a "satellite channel designation" to the corresponding satellite relay terminal station 50.

The satellite relay terminal station 50 then activates the communication channel modem unit 54 usable in the specified frequency (carrier on, reception synchronization establishing), and when the activation of this communication channel modem unit 54 is completed, returns a "connection completion" to the satellite relay base station 41.

When this "connection completion" is received, the satellite relay base station 41 confirms the synchronization establishing at the communication channel modem unit 43, and relays the "communication channel activation" received from the mobile local switching station 4 to the satellite base station 29 side.

At the satellite base station 29 side, the satellite relay terminal station 50 receives this "communication channel activation", and determines a connection between the communication channel modem unit 54 and the digital primary rate interface. The base station 5 then activates a specified communication channel according to the received "communication channel activation" (carrier on).

Thereafter, the reception sequence continues to carry out the operations similar to the usual reception sequence, including a sending of an "activation confirmation" from the base station 5 to the mobile local switching station 4, a sending of a "channel designation" from the mobile local switching station 4 to the mobile station, a sending of a "connection completion" from the mobile station to the mobile local switching station 4, a sending of an "activation completion" from the base station 5 to the mobile local switching station 4, a sending of a "call set up" from the mobile local switching station 4 to the mobile station, a sending of a "calling" from the mobile station to the mobile local switching station 4, and a sending of a "response" from the mobile station to the mobile local switching station 4, so as to put the mobile station in communication through the satellite base station 29, the satellite 28, and the satellite mobile local switching station 27.

Figure 14:
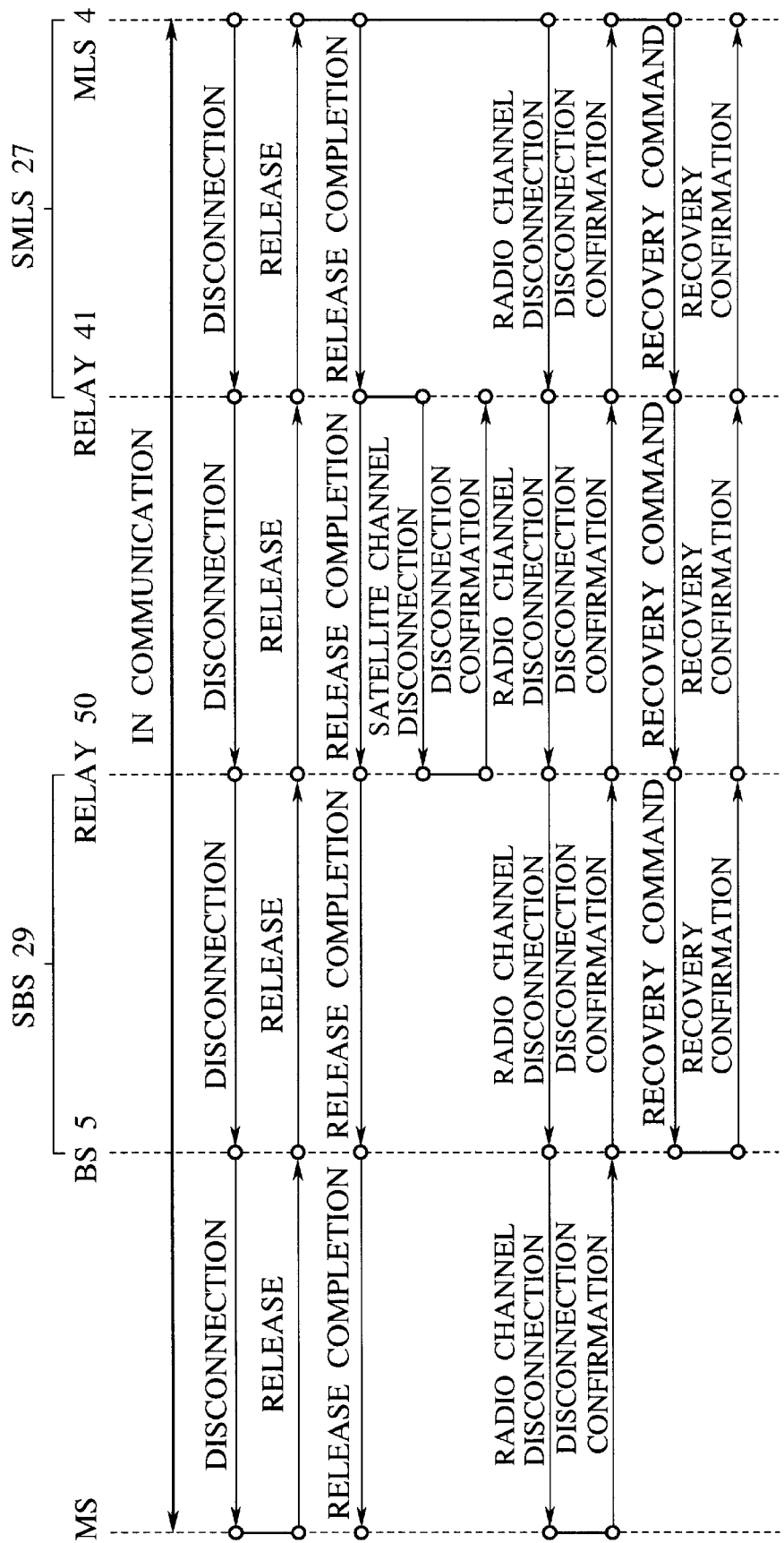
FIG. 14 is a sequence chart for a call termination sequence initiated from a network side in the mobile communication system of FIG. 9.

Next, a call termination sequence initiated from the network side is carried out according to the sequence chart of FIG. 14 as follows.

While the mobile station is in communication, when a "disconnection" for terminating a call processing operation is transmitted from the mobile local switching station 4 of the satellite mobile local switching station 27 to the mobile station through the satellite 28 and the satellite base station 29, the mobile station returns a "release" to the mobile local switching station 4 via the same route in the opposite direction.

Then, the mobile local switching station 4 transmits a "release completion" to the mobile station through the satellite 28 and the satellite base station 29.

Thereafter, the call termination sequence continues to carry out the operations similar to the usual call termination sequence, including a sending of a "radio channel disconnection" for releasing the mobile station from the mobile local switching station 4 to the mobile station, a sending of a "disconnection confirmation" from the mobile station to the mobile local switching station 4, a sending of an "recovery command" for releasing the base station 5 from the mobile local switching station 4 to the base station 5, and a sending of a "recovery confirmation" from the base station 5 to the mobile local switching station 4.

Here, the only difference from the usual call termination sequence is that, when the "release completion" is received from the mobile local switching station 4, the satellite relay base station 41 transmits a "satellite channel disconnection" to the satellite relay terminal station 50 in order to release a specified satellite channel and stops the operation of the corresponding communication channel modem unit 43, and that, when this "satellite channel disconnection" is received", the satellite relay terminal station 50 stops the operation of the corresponding communication channel modem unit 54, and returns a "disconnection confirmation" to the satellite relay base station 41.

Figure 15:
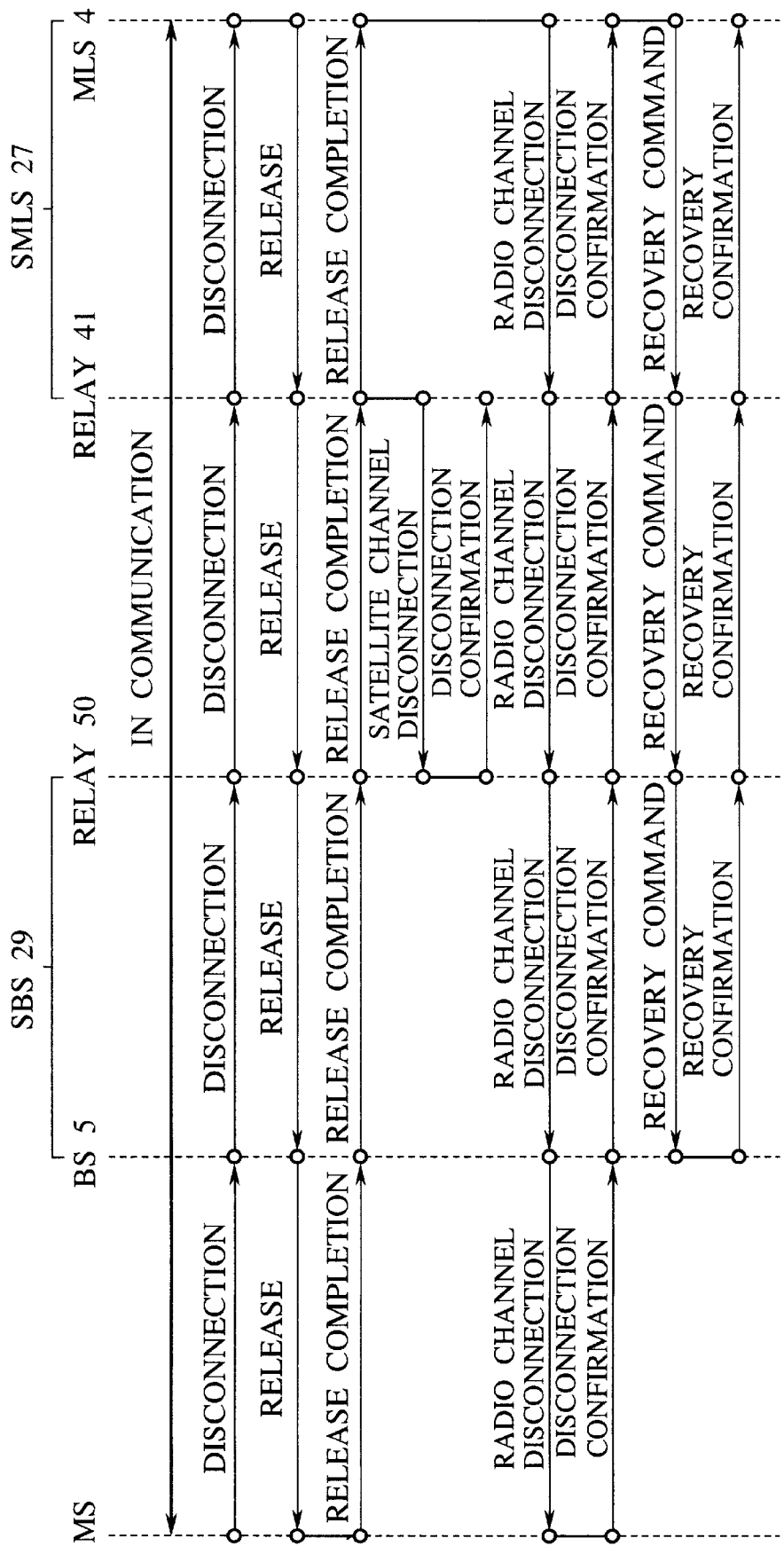
FIG. 15 is a sequence chart for a call termination sequence initiated from a mobile station side in the mobile communication system of FIG. 9.

Next, a call termination sequence initiated from the mobile station side is carried out according to the sequence chart of FIG. 15 as follows.

While the mobile station is in communication, when a "disconnection" for terminating a call processing operation is transmitted from the mobile station to the mobile local switching station 4 of the satellite mobile local switching station 27 through the satellite 28 and the satellite base station 29, the mobile local switching station 4 returns a "release" to the mobile station via the same route in the opposite direction.

Then, the mobile station transmits a "release completion" to the mobile local switching station 4 through the satellite 28 and the satellite base station 29.

Thereafter, the call termination sequence continues to carry out the operations similar to the usual call termination sequence, including a sending of a "radio channel disconnection" for releasing the mobile station from the mobile local switching station 4 to the mobile station, a sending of a "disconnection confirmation" from the mobile station to the mobile local switching station 4, a sending of an "recovery command" for releasing the base station 5 from the mobile local switching station 4 to the base station 5, and a sending of a "recovery confirmation" from the base station 5 to the mobile local switching station 4.

Here, the only difference from the usual call termination sequence is that, when the "release completion" is received from the mobile local switching station 4, the satellite relay base station 41 transmits a "satellite channel disconnection" to the satellite relay terminal station 50 in order to release a specified satellite channel and stops the operation of the corresponding communication channel modem unit 43, and that, when this "satellite channel disconnection" is received", the satellite relay terminal station 50 stops the operation of the corresponding communication channel modem unit 54, and returns a "disconnection confirmation" to the satellite relay base station 41.

As described, according to this second embodiment, because of the use of the satellite, the thinly populated satellite zones which are scattered at various regions can be accommodated in a single satellite mobile local switching station, and therefore a cost required for additional switching stations and land transmission paths at a time of service area expansion can be reduced considerably.

Also, the satellite channel for connecting the satellite base station and the satellite mobile local switching station is to be set up in a manner of demand assign, so that it is possible to reduce a cost for the satellite transmission path.

In addition, because the demand assign control is carried out according to the control data contained in the control channel between the satellite mobile local switching station and the satellite base station, it is possible to utilize the conventional interface between the base station and the mobile local switching station without any fundamental changes, so that there is no need to develop totally new base station and mobile local switching station for the satellite zones.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for expanding a service area of a mobile communication system, comprising the steps of:
    setting a plurality of additional base stations for providing additional zones which covers additional areas for expanding the service area, each additional base station having base station channel connection means for providing a connection with a public network;

providing an additional mobile local switching station for connecting the additional base stations to a mobile communication network, the additional mobile local switching station having switching station channel connection means for providing a connection with the public network; and selectively connecting the additional base stations with the additional mobile local switching station through the public network by using the base station channel connection means and the switching station channel connection means.

2. The method of claim 1, wherein the additional areas are thinly populated areas with light potential traffics.

3. The method of claim 1, wherein the public network is one of an ISDN and an analog telephone network.

4. The method of claim 1, wherein the selectively connecting step connects each additional base station with the additional mobile local switching station only when there is a need to connect a communication of a mobile station located within an additional zone provided by said each additional base station to the mobile communication network.

5. The method of claim 1, wherein each additional base station set by the setting step comprises a base station unit having functions of a usual base station of the mobile communication system, and a network adaptor including the base station channel connection means for connecting the base station unit with the public network.

6. The method of claim 5, wherein the network adaptor of each additional base station set by the setting step comprises the base station channel connection means connected with the public network, a channel multiplexing/demultiplexing switch unit connected with the base station unit, and a common control unit for controlling a connection between the base station channel connection means and the channel multiplexing/demultiplexing switch unit.

7. The method of claim 1, wherein the additional mobile local switching station provided by the providing step comprises a mobile local switching station unit having functions of a usual mobile local switching station of the mobile communication system, and a network adaptor including the switching station channel connection means for connecting the mobile local switching station unit with the public network.

8. The method of claim 7, wherein the network adaptor of the additional mobile local switching station provided by the providing step comprises the switching station channel connection means connected with the public network, a channel multiplexing/demultiplexing switch unit connected with the mobile local switching station unit, and a common control unit for controlling a connection between the switching station channel connection means and the channel multiplexing/demultiplexing switch unit.

9. A mobile communication system, comprising:

a mobile communication network;

a plurality of base stations for providing zones covering a service area of the mobile communication system; and a plurality of mobile local switching stations for connecting said plurality of base stations with the mobile communication network;

wherein said plurality of base stations including a plurality of remote base stations, each remote base station having base station channel connection means for providing a connection with a public network;

said plurality of mobile local switching stations including a remote mobile local switching station for connecting the remote base stations to the mobile communication network, the remote mobile local switching station having switching station channel connection means for providing a connection with the public network; and said plurality of remote base stations and the remote mobile local switching station being selectively connected through the public network by using the base station channel connection means and the switching station channel connection means.

10. The system of claim 9, wherein the remote base stations are set at thinly populated areas with light potential traffics.

11. The system of claim 9, wherein the public network is one of an ISDN and an analog telephone network.

12. The system of claim 9, wherein each remote base station and the remote mobile local switching station are selectively connected only when there is a need to connect a communication of a mobile station located within a zone provided by said each remote base station to the mobile communication network.

13. The system of claim 9, wherein each remote base station comprises a base station unit having functions of a usual base station of the mobile communication system, and a network adaptor including the base station channel connection means for connecting the base station unit with the public network.

14. The system of claim 13, wherein the network adaptor of each remote base station comprises the base station channel connection means connected with the public network, a channel multiplexing/demultiplexing switch unit connected with the base station unit, and a common control unit for controlling a connection between the base station channel connection means and the channel multiplexing/demultiplexing switch unit.

15. The system of claim 9, wherein the remote mobile local switching station comprises a mobile local switching station unit having functions of a usual mobile local switching station of the mobile communication system, and a network adaptor including the switching station channel connection means for connecting the mobile local switching station unit with the public network.

16. The system of claim 15, wherein the network adaptor of the remote mobile local switching station comprises the switching station channel connection means connected with the public network, a channel multiplexing/demultiplexing switch unit connected with the mobile local switching station unit, and a common control unit for controlling a connection between the switching station channel connection means and the channel multiplexing/demultiplexing switch unit.

17. A method for expanding a service area of a mobile communication system, comprising the steps of:

setting a plurality of additional base stations for providing additional zones which covers additional areas for expanding the service area, each additional base station having base station satellite connection means for providing a connection with a satellite;

providing an additional mobile local switching station for connecting the additional base stations to a mobile communication network, the additional mobile local switching station having switching station satellite connection means for providing a connection with the satellite; and selectively connecting the additional base stations with the additional mobile local switching station through the satellite by using the base station satellite connection means and the switching station satellite connection means.

18. The method of claim 17, wherein the additional areas are thinly populated areas with light potential traffics.

19. The method of claim 17, wherein the selectively connecting step transmits control data between each additional base station and the additional mobile local switching station through a specific satellite channel which is fixedly used as a control channel, and connects each additional base station with the additional mobile local switching station by using satellite channels set up by a demand assign control according to the control data in the control channel.

20. The method of claim 17, wherein each additional base station set by the setting step comprises a base station unit having functions of a usual base station of the mobile communication system, and a satellite relay station unit including the base station satellite connection means for connecting the base station unit with the satellite.

21. The method of claim 20, wherein the satellite relay station unit of each additional base station set by the setting step comprises the base station satellite connection means for providing a connection with the satellite, a channel multiplexing/demultiplexing switch unit connected with the base station unit, and a demand assign control unit for controlling a connection between the base station satellite connection means and the channel multiplexing/demultiplexing switch unit.

22. The method of claim 17, wherein the additional mobile local switching station provided by the providing step comprises a mobile local switching station unit having functions of a usual mobile local switching station of the mobile communication system, and a satellite relay station unit including the switching station satellite connection means for connecting the mobile local switching station unit with the satellite.

23. The method of claim 22, wherein the satellite relay station unit of the additional mobile local switching station provided by the providing step comprises the switching station satellite connection means for providing a connection with the satellite, a channel multiplexing/demultiplexing switch unit connected with the mobile local switching station unit, and a demand assign control unit for controlling a connection between the switching station satellite connection means and the channel multiplexing/demultiplexing switch unit.

24. A mobile communication system, comprising:

a mobile communication network;

a plurality of base stations for providing zones covering a service area of the mobile communication system; and a plurality of mobile local switching stations for connecting said plurality of base stations with the mobile communication network;

wherein said plurality of base stations including a plurality of satellite base stations, each satellite base station having base station satellite connection means for providing a connection with a satellite;

said plurality of mobile local switching stations including a satellite mobile local switching station for connecting the satellite base stations to the mobile communication network, the satellite mobile local switching station having switching station satellite connection means for providing a connection with the satellite; and said plurality of satellite base stations and the satellite mobile local switching station being selectively connected through the satellite by using the base station satellite connection means and the switching station satellite connection means.

25. The system of claim 24, wherein the satellite base stations are set at thinly populated areas with light potential traffics.

26. The system of claim 24, wherein each satellite base station and the satellite mobile local switching station are selectively connected by transmitting control data between said each satellite base station and the satellite mobile local switching station through a specific satellite channel which is fixedly used as a control channel, and connecting said each satellite base station with the satellite mobile local switching station by using satellite channels set up by a demand assign control according to the control data in the control channel.

27. The system of claim 24, wherein each satellite base station comprises a base station unit having functions of a usual base station of the mobile communication system, and a satellite relay station unit including the base station satellite connection means for connecting the base station unit with the satellite.

28. The system of claim 27, wherein the satellite relay station unit of each satellite base station comprises the base station satellite connection means for providing a connection with the satellite, a channel multiplexing/demultiplexing switch unit connected with the base station unit, and a demand assign control unit for controlling a connection between the base station satellite connection means and the channel multiplexing/demultiplexing switch unit.

29. The system of claim 24, wherein the satellite mobile local switching station comprises a mobile local switching station unit having functions of a usual mobile local switching station of the mobile communication system, and a satellite relay station unit including the switching station satellite connection means for connecting the mobile local switching station unit with the satellite.

30. The system of claim 29, wherein the satellite relay station unit of the satellite mobile local switching station comprises the switching station satellite connection means for providing a connection with the satellite, a channel multiplexing/demultiplexing switch unit connected with the mobile local switching station unit, and a demand assign control unit for controlling a connection between the switching station satellite connection means and the channel multiplexing/demultiplexing switch unit.

* * * * *